(12) United States Patent
Cheung

(10) Patent No.: US 7,246,568 B1
(45) Date of Patent: Jul. 24, 2007

(54) SPORTS BOARD WITH INTEGRAL LAMINATED STIFFENING ELEMENT

(76) Inventor: Wah Kan Cheung, 55 Doncaster Ave., Suite 102, Thornhill, Ontario (CA) L3T 1L7

( * ) Notice: Subject to any disclaimer, the term of this patent is extended or adjusted under 35 U.S.C. 154(b) by 0 days.

(21) Appl. No.: 11/368,106

(22) Filed: Mar. 3, 2006

(51) Int. Cl.
*B63B 5/24* (2006.01)
(52) U.S. Cl. ........................................ 114/357; 441/65
(58) Field of Classification Search .................. 441/65, 441/74; 114/357
See application file for complete search history.

(56) References Cited

U.S. PATENT DOCUMENTS

| | | | | |
|---|---|---|---|---|
| 5,489,228 A | * | 2/1996 | Richardson et al. | 441/74 |
| 5,647,784 A | * | 7/1997 | Moran | 441/65 |
| 5,658,179 A | * | 8/1997 | Glydon et al. | 441/74 |
| 5,928,045 A | * | 7/1999 | Szabad | 441/74 |
| 5,934,961 A | * | 8/1999 | Mehrmann et al. | 441/65 |
| 5,944,570 A | * | 8/1999 | Appleby | 441/65 |
| 6,908,351 B2 | * | 6/2005 | Burke | 441/65 |
| 2005/0202737 A1 | * | 9/2005 | Cheung | 441/65 |
| 2006/0073325 A1 | * | 4/2006 | Cheung | 428/319.3 |
| 2006/0116038 A1 | * | 6/2006 | Cheung | 441/65 |

* cited by examiner

*Primary Examiner*—Stephen Avila
(74) *Attorney, Agent, or Firm*—Clement Cheng

(57) ABSTRACT

A sport board for snow sledding or surf body boarding comprises a multi-layered laminated composite foam core coupled with stiffening elements for mechanical strengthening of the board. The composite foam core comprises laminates of polyolefin foam base and stiffening elements composed of substantially polymer foam and has substantial higher compressive strength and flexural strength than the foam base. A front section may be made of the same blank material as the low density polyolefin foam base and is bonded to the front end of the foam core complex to give a full frontal flexibility for a higher directional control by the rider and improved shock absorbing property. Upper and lower polyethylene foam sheets wrap the foam core complex subassembly and head section for sled integrity and graphic film finishes the sled top, the bottom is also finished with a polyethylene sheet for slickness.

27 Claims, 8 Drawing Sheets

SPORTS BOARD WITH INTEGRAL LAMINATED STIFFENING ELEMENT

BACKGROUND OF THE INVENTION

A. Field of the Invention

The present invention relates generally to sports boards, and more particularly to polyethylene based composite foam boards for gliding on snow or water having a stiffening element coupled to the core for mechanical strengthening of the board. The present invention relates to stiffening elements composed of substantially polymer foam that may be placed in selected positions to selectively increase rigidity to selected portions of a foam board. With controlled placement of stiffening element, the foam board can be adapted to have higher stiffness in a first portion and greater flexibility in a second portion of the board.

B. Description of the Prior Art

Polyethylene foam sports boards have recently become very popular, in particular in the application as snow sleds, bodyboards and other kinds of gliding boards or the like. However, one drawback in using a polyethylene foam sports board is that it does not have the desirable stiffness against the flex of the foam board caused by the weight of the rider and this impairs the maneuverability of the sports board. For example, in the application of snow sled, such deformation of the board will result in the foam sled submerging below the snow surface and thereby reduce the sliding speed and directional stability when carrying a rider sliding down a snow-covered slope. It is obviously more desirable to have a foam sled or a bodyboard having higher flexural strength.

Some prior arts apply a foam core of higher stiffness to overcome the problem. For example, polystyrene (PS) foam has higher flexural strength at a similar density than does polyethylene (PE) foam. Due to the difference in chemical composition between the foam core, the polyethylene foam skin and polyethylene slick film, manufacturing requires special bonding material and techniques to bond the polyethylene skin to the foam core. That makes the manufacturing difficult and costly. Some manufacturers try to produce a polyethylene foam board with higher flexural strength by increasing the thickness or density of foam core, or by laminating a thick polymer film outside the foam board. Yet this increases the weight of foam board degrading desirable performance in its applications as a snow sled or bodyboard. It would be desirable to provide a method to make a polyethylene foam sports board at a lower density and less weight but with sufficient stiffness to support a rider to perform the intended function on the sports board. Also desirable is to provide a method to make a foam sports board that has high flexural strength at relatively low cost.

Polystyrene foam core has been used to produce foam sports boards due to its lightweight and rigid properties. However, there are some drawbacks associated with a polystyrene foam core. For example, in the case of snow sled application, a polystyrene foam core does not provide the same degree of comfort in terms of cushioning and shock absorption properties when compared with a polyethylene foam core. In addition, the polystyrene foam is poor in elastic recovery under even minor impact force, and may form undesirable indentations such as in the front portion of a snow sled. It may be desirable to develop a foam core that has the structure stiffness advantages of a polystyrene foam core in the main body and the desirable resilient and shock absorption properties of polyethylene foam in the top and front portion of the board.

One typical method of strengthening bodyboard is to insert one or more cylindrical rods, know as stringers, into holes drilled parallel to the longitudinal axis of the board from the tail end toward the nose end. A stringer system would generally include a fiberglass or graphite rod that is centrally inserted and adhesively secured in the foam core material. The disadvantage of the current stringer systems used is that the stringer may separate from the foam core after frequent use, in extreme conditions of use, for example when the board is bent up harshly, the stringer rod can pop out of either the deck or the bottom of the bodyboard. It would be desirable to provide a method to insert stiffening element by heat laminating to the foam core so that a strong bond forms between stiffening element and the foam core.

Typically, in use, the rider of a bodyboard grips the front edge close to one corner of lead nose and front portion of the side edge of the bodyboard. The hand in the front edge plays a significant role in steering control and maneuvering the bodyboard. Successful completion of maneuvers requires the bodyboard to respond adequately to the rider's steering. Force applied to the bodyboard that only distorts the board does not help the rider in redirecting the board. Thus, a high degree of stiffness of the bodyboard is desirable. However, it may not be desirable to make the bodyboard very rigid entirely from the nose to the tail. For example, it may be desirable for the board to be more flexible at the portion between a transverse line about a quarter of the way from the nose and the lead nose. Such flexibility allows the rider to pull up the nose of board and keep the nose and lead corners from dropping under the water's surface in a dynamic situation where the nose is being forced downwardly. However, in the forward quarter of the board, it is generally considered desirable for the board to be very stiff along a transverse line so that the rider's steering inputs on one side of the board will effectively be transmitted to the opposite side of the board and redirect the opposite side. It is therefore more desirable to provide an improved foam core with stiffening element adapted to increase the stiffness of a selected portion of the board. It is also desirable to provide an improved foam core with stiffening element adapted to provide the resistance to flex along a transverse axis and yet allow adequate flexibility along a longitudinal axis of the foam core in the forward quarter of the board.

The necessary condition to provide stiffening to a composite foam core is that the flexural strength of the coupled stiffening element has to be substantially higher than that of the low density base foam core. It is apparent that when applying polystyrene foam plate as the stiffening element to a polyolefin foam base core, the polystyrene foam plate contributes higher flexural strength and a stiffening effect. In the case of monolayer of high density polyolefin foam sheet, the stiffening effect is based on the fact that the compressive strength of plastic foam such as polyethylene foam can vary with direction relative to the direction of extrusion, the maximum strength being along the direction of extrusion. In the case of a sandwich structure of polyolefin foam/polyolefin sheet/polyolefin foam, the stiffening effect is mostly derived from the higher flexural strength of the solid polyolefin sheet.

In the process of foam sheet extrusion, the cells are stretched in the direction of the extrusion. The thin plastic film of each cell wall is oriented and strength hardened by the shear stress exerted by the material flow in the extrusion process. The greater strength hardening effect accomplished with orientation of cell along the extrusion direction and surface energy associated with the cell having an oval cross section are closely related to the higher compressive strength of plastic foam structure along the extrusion direction.

In FIG. 1, maximum compressive strength of polyethylene foam sheet is parallel to direction Y provided by shearing force of foam sheet extrusion and the cell orientation of cell group of a conventional extruded polyethylene foam sheet wherein the cells are elongated in parallel alignment with vector Y along which the foam sheet is extruded as shown in FIG. 2, a magnification of the foam sheet section in the circle of FIG. 1.

It is one object of the invention to provide a polyolefin foam sports board with improved compressive strength by the use of a stiffening element having high compressive strength in the Y direction.

It is yet another object of the invention to provide a low density foam board having high flexural strength in the Y direction by the use of a stiffening element.

It is yet another object of the invention to provide an improved foam board having a polyolefin foam core coupled with light weight stiffening element composed of substantially polymer foam material, wherein the polyolefin foam core and the stiffening element can be integrally heat bonded.

It is yet another object of the invention to provide an improved foam board having a polyethylene foam core coupled with stiffening element adapted to increase the stiffness of a selected portion of the board.

It is yet another object of the invention to provide an improved foam core that has the structure stiffness advantages of a polystyrene foam core in the main body and the desirable resilient and shock absorption properties of polyethylene foam in the top and front portion of the board.

It is yet another object of the invention to provide an improved bodyboard with stiffening element adapted to provide the resistance to flex along a transverse axis and yet allow adequate flexibility along a longitudinal axis of the foam core in the forward quarter of the board.

SUMMARY OF THE INVENTION

The present invention provides the solution to the above-mentioned problem by introducing generally planar stiffening element composed of substantially polymer foam into a low density polyolefin foam base, forming a composite foam core. The stiffening element has substantial higher compressive strength and flexural strength than the foam core. The sport board according to the present invention may be constructed as a foam sled to ride on at snow-covered slopes or a bodyboard for surfing at the seashore.

The composite polyolefin foam core in accordance with the invention is a multi-layer laminated foam core, comprising alternative layers of low density polyolefin foam and polyolefin stiffening element. The stiffening elements are integrally heat laminated with the low density polyolefin foam to form an integrated composite foam core with improved compressive strength along the Y axis and a higher flexural strength along the X-Y plane of the board. At least one stiffening element is applied to the composite foam core to provide mechanical strengthening to the board. The low density polyolefin foam comprises a polyolefin polymer, such as homopolymer or copolymer of polyethylene and homopolymer or copolymer of polypropylene, more preferable a low density polyethylene foam.

In one aspect of the invention, the stiffening element may be a thin layer of polyolefin structure including a layer of high density polyolefin foam sheet or a laminate of polyolefin structure consisting of three layers. The high density polyolefin foam sheet may include homopolymer or copolymer of polyethylene and homopolymer or copolymer of polypropylene, more preferable a polyethylene homopolymer. The three layers of the polyolefin laminate may comprise a laminate structure of polyethylene foam sheet/polyethylene sheet/polyethylene foam sheet or polypropylene foam sheet/polypropylene sheet/polypropylene foam sheet. In accordance to the preferred embodiment of the present invention, these thin layers of polyolefin structure are substantially planar layers with opposing surfaces oriented in a direction generally parallel to the X-Y plane of the core.

In another aspect, the stiffening element may also be a thick polystyrene foam plate having a thickness higher than about 8 mm. The thick polystyrene foam layers are heat laminated to the low density polyolefin foam layers with substantially planar bonding surfaces. In one embodiment, the bonding surfaces are oriented in a direction generally parallel to the X-Y plane of the core. In another embodiment, the bonding surfaces are oriented in a direction generally parallel to the X-Z plane of the core.

The stiffening element may extend throughout the length of the sports board to provide an even stiffness to the board. Alternative, the stiffening element may selectively be applied to the rider supporting section of the board to provide a high compression resistance and flexural strength against the rider's weight. A front section of low density polyolefin foam may be bonded to the front end of the foam core complex to give a full frontal flexibility. A rear section of low density polyolefin foam may also be bonded to the rear end of the foam core complex if desirable. The resulting sports board with a flexible front section and a rigid supporting main body is particularly useful in the application of both snow sled and bodyboard. The stiffening elements provide the board with improved rigidity, allowing improved maneuvering of a bodyboard and higher sliding speed for a snow sled. It is particularly useful that the flexibility near the front quarter length of a bodyboard provides desirable flex to a rider to manipulate directional steering during wave surfing. In the snow sled application, the flexible front section provides desirable resilient and shock absorbing properties to the board, in particular for front impact.

DETAILED DESCRIPTION OF THE PREFERRED EMBODIMENT

Figure 3:
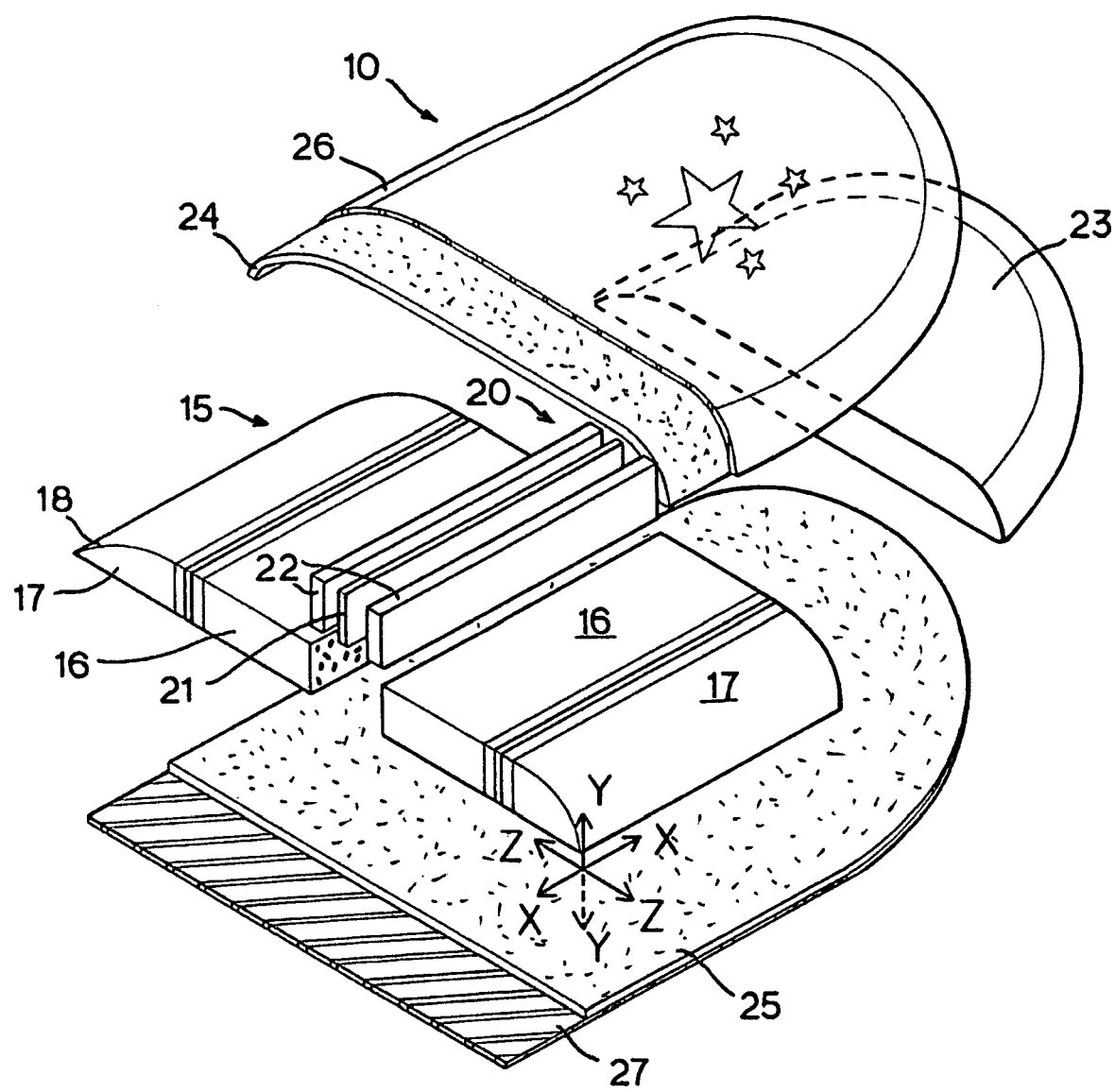
FIG. 3 is an exploded view of the foam sled comprising the foam core complex in accordance with a first embodiment of the present invention.
Figure 4:
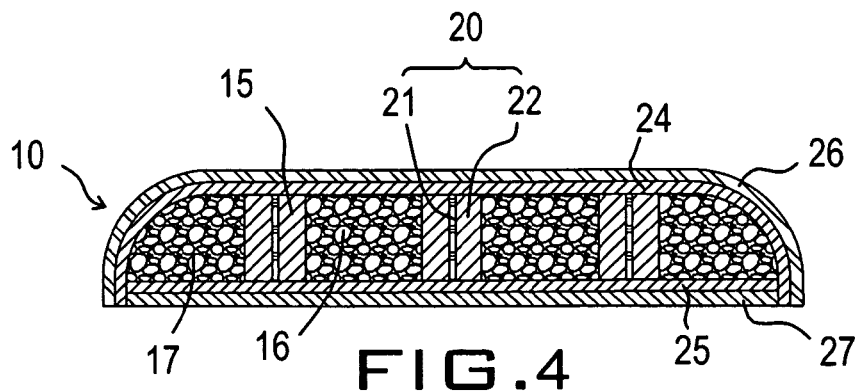
FIG. 4 is a cross sectional view of the foam sled of FIG. 3.

Referring to FIGS. 3 and 4, the sport board 10 according to the present invention is constructed as a foam sled to ride on at snow-covered slopes. The foam sled 10 is an elongated board having a substantially planar main body with round edges and front tip deflected upward. The foam sled includes a polyethylene composite foam core assembly composed of a polyethylene composite foam complex 15 which acts as the supporting main body of the board, a front section of low density polyethylene foam 23 and a rear section of low density polyethylene foam 28 (not shown in FIG. 3). The composite foam complex is a multi-layer laminated foam structure, comprising alternative layers of low density polyethylene foam layers 16, 17 and polyethylene stiffening element 20, in which the bonding surfaces oriented in a direction generally parallel to the X-Y plane of the board. The stiffening element layer further comprises a central thin layer of polyethylene sheet 21 coupled with two high density polyethylene foam sheets 22 on both sides. The stiffening elements provide the board with a stronger resistance to vertical compression and higher flexural strength along the X-Y plane while the polyethylene foam front section provides resilient and shock absorbing properties to the front section of the board. In this particular embodiment, the composite foam complex contains three stiffening elements interposed with low density foam layers. It is understood that one or more than more stiffening elements may be applied to the composite foam complex to achieve desirable strength and performance properties.

The low density polyethylene foam plate 16, 17, 23 and 28 has thickness in the range of 0.25 to 2 inch, preferably of 1 inch and has a density in the range of 1.6 to 3 lb/ft$^3$, and preferably a density of about 2.2 lb/ft$^3$. The central polyethylene sheet 21 of the stiffening element 20 has a thickness between 0.3 to 3 mm, and preferably a thickness of about 1.5 mm and has a density in the range of 0.91 to 0.98 g/cm$^3$, and preferably a density of about 0.95 g/cm$^3$. The high density polyethylene foam sheets 22 has a thickness between 2 to 6 mm, and preferably a thickness of about 4 mm. High density polyethylene foam sheets 22 has a density in the range of 4 to 10 lb/ft$^3$, and preferably a density of about 8 lb/ft$^3$. As shown in FIGS. 3 and 4, the sports board 3 includes a top skin comprised of two layers laminated together and a bottom skin also comprised of two layers laminated together.

Top layer 26 is a graphically-imprinted polyethylene film. The film may be a single layer or double-layer film. The graphics on layer 26 are imprinted using any of several conventional processes for printing. An example of such a process is corona printing, in which an electrical discharge temporarily alters the surface molecules of the polyethylene film, allowing inks to adhere to the film. Layer 26 has a thickness of between 0.02 to 0.15 mm, and preferably a thickness of about 0.07 mm. Layer 26 has a density in the range of 0.91 to 0.98 g/cm$^3$, and preferably a density of about 0.95 g/cm$^3$. Layer 24 is polyethylene foam. Layer 24 has a thickness of between 1 to 5 mm, and preferably a thickness of about 3 mm and a density in the range of 4 to 8 lb/ft$^3$ and preferably of about 6 lb/ft$^3$. The slick layer 27 has a thickness in the range of 0.2 to 1.5 mm and preferably of about 0.35 mm and a density in the range of 0.91 to 0.98 g/cm$^3$ and preferably of about 0.95 g/cm$^3$. Layer 25 is polyethylene foam. Layer 25 has a thickness of between 1 to 5 mm, and preferably a thickness of about 3 mm and a density in the range of 4 to 8 lb/ft$^3$ and preferably of about 6 lb/ft$^3$.

Figure 9:
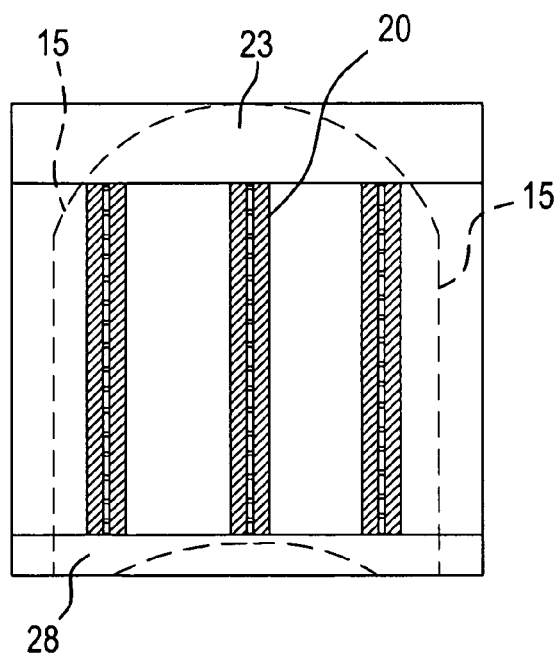
FIG. 9 shows the first embodiment of the present invention wherein a separate front section and a rear section of low density foam material are attached to the foam core complex having three stiffening elements in a low density foam base body to give a higher flexibility to the front and rear sections of the sports board.

A front section 23 may be made out of the same blank material as the low-density polyethylene foam plates 16 and 17 and is heat bonded to the front end of the composite foam complex 15 to allow greater nose flexibility for improved impact shock absorption. Similarly a rear section 28 may also be heat bonded to the rear end of the composite foam complex 15. FIG. 9 is a plan view of the resulting composite foam core assembly of the first embodiment in FIG. 3. Thus, in the present embodiment of the invention, the sled 10 provides the dual advantages of high compression resistance against the user's riding load as well as maintaining the desirable shock absorbing property of polyethylene foam in the nose region.

Figure 10:
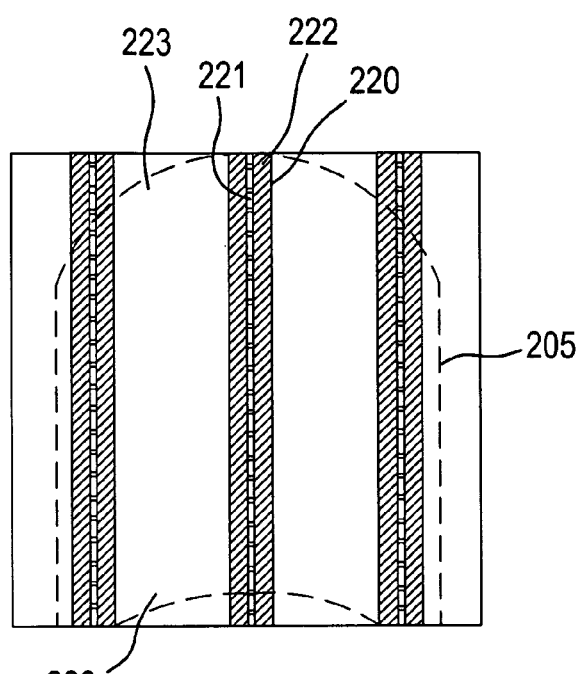
FIG. 10 shows the third embodiment of the present invention wherein the foam core complex has three stiffening elements in a low density foam base body, extending from the rear end to the front end of the board.

FIG. 10 is the third embodiment of the invention showing an alternative configuration of the stiffening element from the first embodiment. FIG. 10 shows a foam core complex 205 having the stiffening elements 220 extending throughout the length of the foam core complex 205 to give a higher and even stiffness to the foam sled 10. This embodiment may be desirable to provide a sports board with high stiffness and high sliding speed for performance board. In the first embodiment as illustrated in FIG. 9, the stiffening elements are selectively placed to the load supporting section of the board by which the stiffening elements substantially increase the stiffness of the board without significant weight increase to the board. High stiffness is desirable for higher sliding speed and lighter weight is also desirable for rider particularly young children to carry the sled up a slope. FIGS. 9 and 10 shows three stiffening stringers. Depending upon the construction and the performance characteristics desired, having either one or two stiffening stringers could be the best mode.

Figure 5:
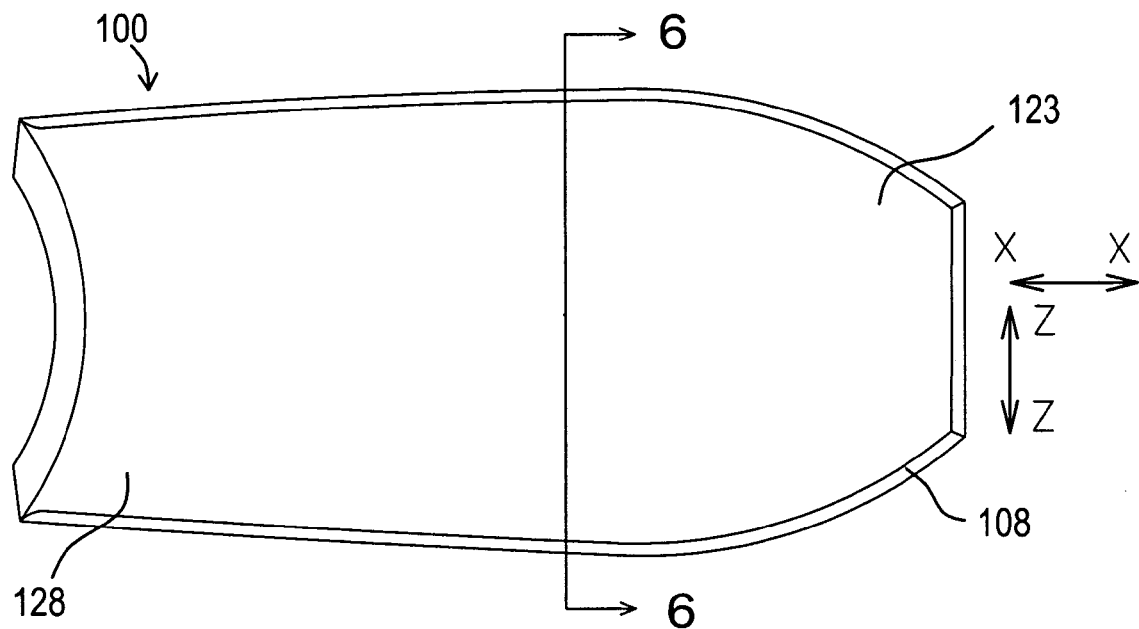
FIG. 5 is a plan view of the bodyboard comprising the foam core complex in accordance with a second embodiment of the present invention.
Figure 6:
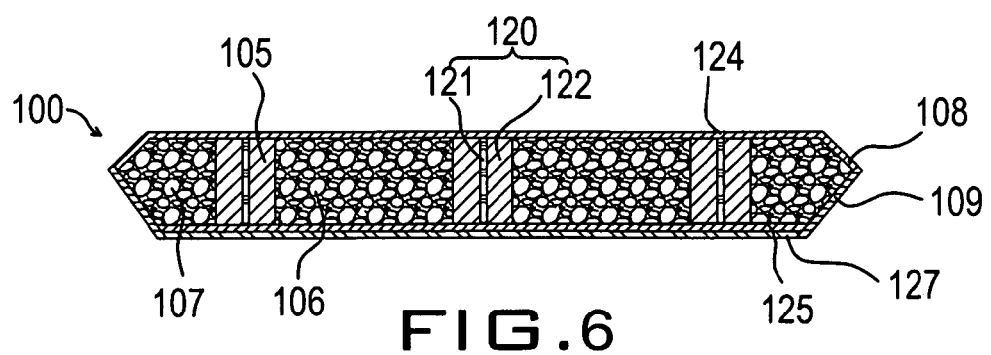
FIG. 6 is a cross sectional view taken along 6-6 of FIG. 5.

FIGS. 5 and 6 show a second embodiment of the present invention in a bodyboard 100 for surfing or body boarding. The bodyboard 100 is generally a planar board having a bottom surface, a top surface, front surface, tail surface and two side rail surfaces, the board is characterized by having two angularly outwardly extending side rails 108 and 109. The composite foam complex 105 has the same composition and construction as the composite foam complex 15 of the first embodiment. The foam complex 105 also consists of a multi-layer laminated foam structure, comprising alternative layers of low density polyethylene foam layers 106, 107 and polyethylene stiffening element layers 120.

Similar to the first embodiment, a front section 123 also called a nose 123 may be made out of the same blank material as the low density polyethylene foam plates 106 and 107 and is bonded to the front end of the foam complex 105 to allow greater nose flexibility for improved maneuvering and greater directional control by the rider. A tail section 128 of low density polyethylene foam may also be bonded to the rear end of the foam complex if desirable.

Alternatively, the stiffening elements 120 may extend throughout the length of the foam core complex 105 to provide a higher and even stiffness to the entire length of the bodyboard 100.

The deck layer 124 and rail layer 109 are both polyethylene foam. They have a thickness in the range of 2 to 8 mm and preferably of about 4.5 mm and a density in the range of 4 to 10 lb/ft$^3$ and preferably of about 7 lb/ft$^3$. The slick layer 127 is a polyethylene film. Layer 127 has a thickness in the range of 0.3 to 0.8 mm and preferably of about 0.50 mm and a density in the range of 0.91 to 0.98 g/cm$^3$ and preferably of about 0.95 g/cm$^3$. Layer 125 is polyethylene foam. Layer 125 has a thickness in the range of 1 to 5 mm and preferably of about 3 mm and a density in the range of 4 to 8 lb/ft$^3$ and preferably of about 6 lb/ft$^3$. The low density foam 106, 107 is of polyethylene having a thickness in the range of 1 to 2.5 inch, preferably of 2 inch. The low density foam 106, 107 has a density in the range of 1.6 to 3 lb/ft$^3$ and preferably of about 2.2 lb/ft$^3$ and the composition and structure of the stiffening element is the same as that of the first embodiment as shown in FIGS. 3 and 4.

In this particular embodiment of bodyboard 100, the stiffening elements is selectively placed in the middle load supporting region to increase the rigidity of the board for supporting a rider in surfing but allowing flexibility in the nose and tail regions. It is particularly useful that the flexibility near the front quarter length of nose improves steering in a bodyboard.

The bodyboard 100 of the present invention provides the dual advantages of high compression resistance and flexural strength against the user's riding load as well as a desirable flexibility in the nose section for an improved maneuverability in directional control in wave surfing.

Figure 7:
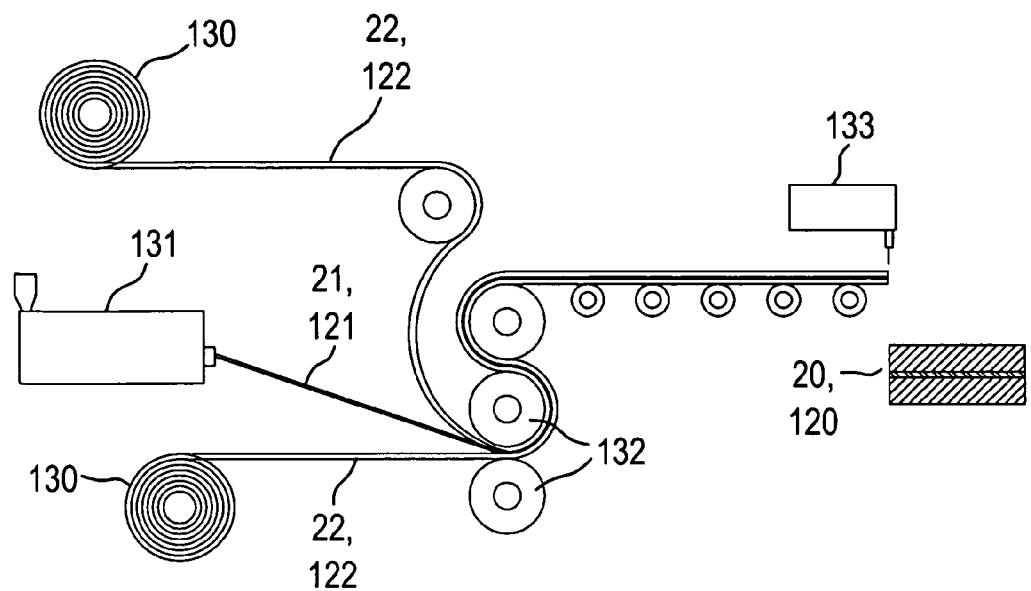
FIG. 7 is a side view showing the first manufacturing step for the 3-ply stiffening elements of the foam core complex according to the present invention.

Sports board 10 is formed in a series of steps. The first step is to make the foam core complex 15. The foam core complex 105 of the bodyboard 100 is also fabricated by the same manufacturing process. FIG. 7 shows the first manufacturing step for the 3-ply stiffening elements 20, 120 of the foam core complex 15, 115 wherein upper and lower rolls 130 of high-density polyethylene foam sheets supply two side layers 22, 122 with an extruder 131 feeding a continuous sheet 21, 121 of hot polyethylene material between the two side layers 22, 122 with the assistance of transverse rollers 132, which compress and bind the three-layer strip into a component of the foam core complex 15, 115. The leading end of the strip is conveyed under a cutter 133, which cuts the strip into the stiffening elements 20, 120.

Figure 8:
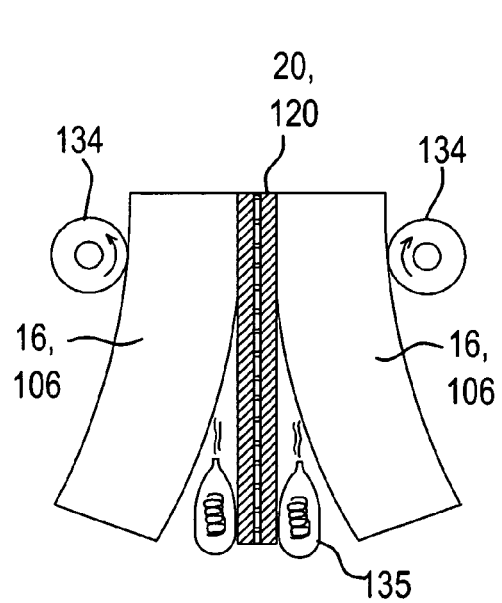
FIG. 8 is a plan view showing the second manufacturing step to complete the foam core complex with changing level of density using the stiffening elements of FIG. 7 sandwiched between low density polyethylene foam plates.

Then, the cut element 20, 120 is again sandwiched between the foam sections 16 and/or 17, which pass through opposing vertical rollers 134 as they are welded by heat blowers 135, as shown in the plan view of FIG. 8. The similar step may be repeated for additional number of stiffening elements 20, 120 in the foam core complex as desired.

In this embodiment, a front section and a rear section of polyethylene foam plank are heat bonded to the foam core complex 15. FIG. 9 is a plan view of the resulting foam core complex 15 of the first embodiment in FIG. 3 having its head 23 and tail 28 sections formed out of the same blank material of low-density polyethylene foam but lacking the compression element 20 to provide higher flexibility to both ends of the foam sled 10. The resulting foam core assembly is then die cut, trimmed and shaped to the desirable shape and edge configuration. It is understood that the similar plan of assembly may be applied to the manufacture of the bodyboard 100.

Figure 16:
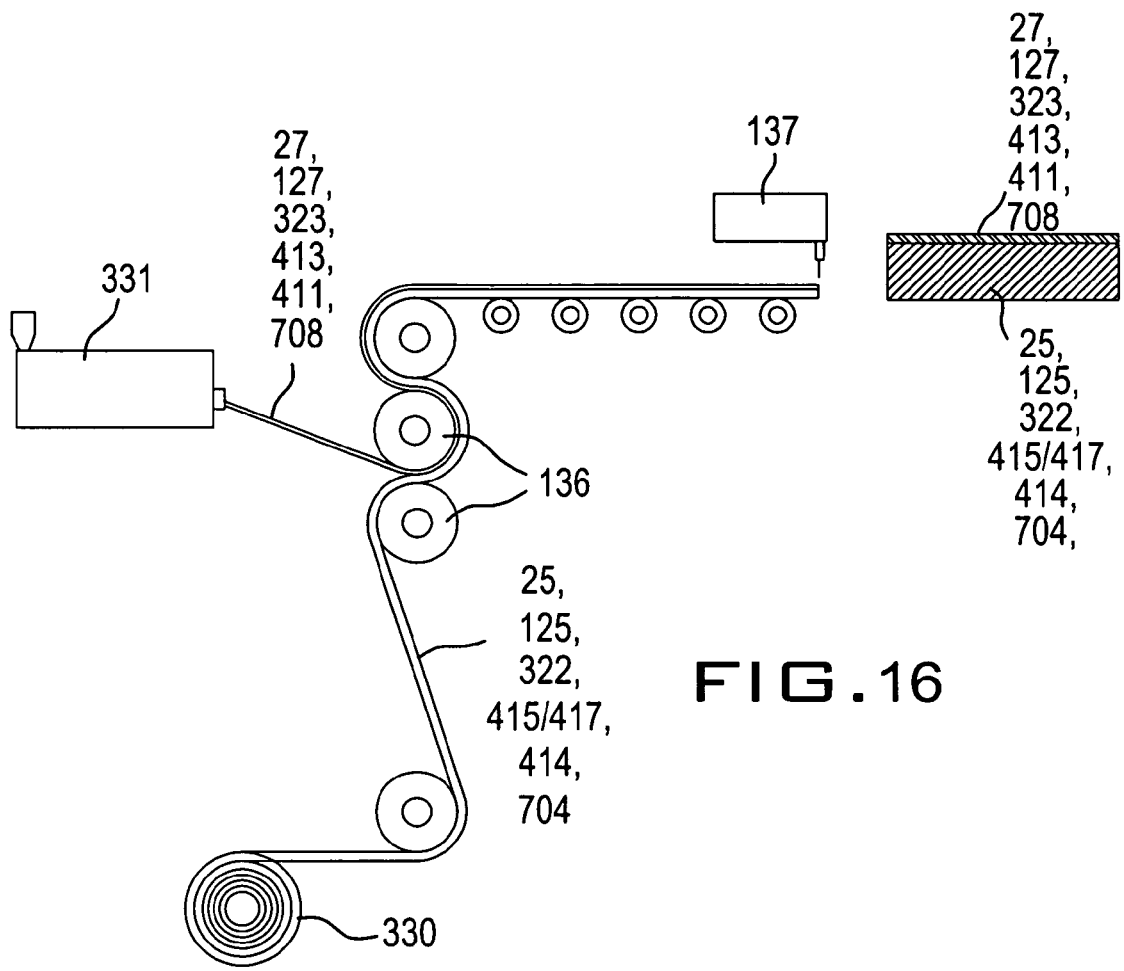
FIG. 16 is a view showing the manufacturing step to make slick bottom members.

Next step is to prepare the top skin and bottom skin laminates. Polymer film layer 26 is imprinted with the desired graphics using a conventional imprinting procedure. Layer 26 is then laminated to polyethylene foam sheet 24 to form the top skin laminate 24/26 by any one of conventional laminating processes. One conventional process of laminating a polyethylene film to polyethylene foam sheet is to apply heat to the film layer with a heated nip roller on the film side and a normal nip roller on the foam side, where the heated nip roller may be have embossed pattern of convex and concave area for better heat transfer. A hot melt resin may also be extruded onto the film and foam surfaces to heat bond the two layers. As shown in FIG. 16, Extruder 331 extrudes a continuous film of layer 27 and disposes onto the surface of Layer 25 to form the bottom skin laminate 27/25 so that a slick sheet backed by the polyethylene foam is cut out at a cutting stage 137 for a subsequent heat-bonding process.

Figure 17:
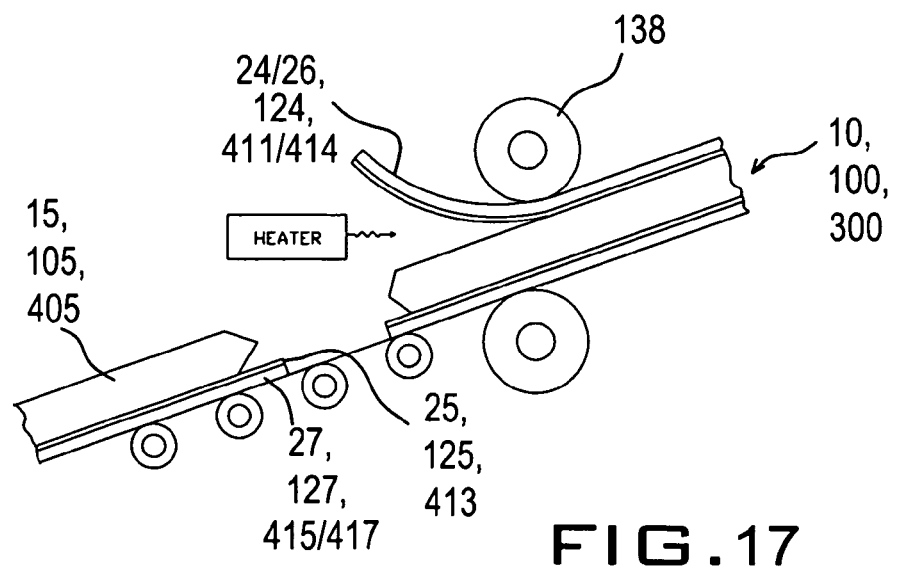
FIG. 17 is a view showing the final manufacturing step to bond a top deck to the sports board having a slick bottom.

The bottom skin laminate 27/25 is heat laminated to the bottom surface of the foam core assembly. Similarly the top skin laminate 24/26 is then heat laminated to the top surface of the foam core assembly. The heat laminating process is illustrated in FIG. 17. The extending edge of top skin laminate is finally wrapped around and heat bonded to the sloped edge of the foam core assembly, forming the fully-laminated board 10.

FIG. 10 is the third embodiment of the invention. FIG. 10 shows a foam core complex 205 having the stiffening elements 220 extending throughout the length of the foam core complex 205 to give an even stiffness to the foam sled 10 as needed by the riders for higher sliding speed and improved directional tracking. Conversely, the similar plan of manufacture can be applied in making the bodyboard 100.

Sports board 100 is also formed in a series of steps similar to that of the sports board 10. The foam core complex 105 is fabricated according to the same manufacturing steps as described above in the sports board 10. The bottom skin laminate 125/127 is then heat laminated to the bottom surface of the foam core assembly. After that, the top polyethylene foam skin 124 is heat laminated to the top surface of the foam core assembly. The heat laminating process is illustrated in FIG. 17. The extending edge of top skin 124 is then wrapped around and heat bonded to the upper rail surface 108. Finally a strip of polyethylene foam sheet 109 is attached to cover the two lower rail surfaces, forming the fully-laminated board 100.

Figure 11:
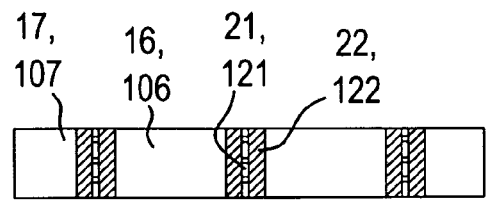
FIG. 11 is a cross-sectional view showing the stiffening element made of a solid polyethylene sheet sandwiched by a couple of high-density polyethylene foam sheets.
Figure 12:
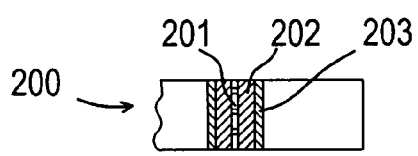
FIG. 12 is a view showing an alternative of the above embodiments of the invention wherein the stiffening element is made of a solid PP sheet sandwiched by a couple of high-density PP foam sheets and an adhesive resin is used to bond the stiffening elements to the low density foam base body.
Figure 13:
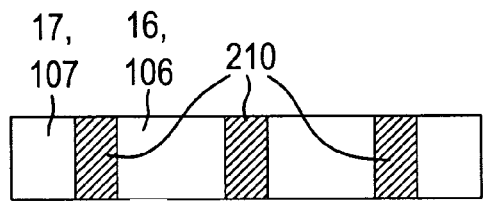
FIG. 13 is a view showing an alternative of the above embodiments of the invention wherein the stiffening elements are sections of high-density polyethylene foam in the low density foam base body of the foam core complex.

FIGS. 11, 12, and 13 are three alternative constructions of the stiffening elements. Each of the stiffening element is constructed with a non-expanded or lightly expanded plastic sheet made of polyolefin polymer consisting of polyethylene or polypropylene, which being laminated to both sides with a high-density foam sheets of polyolefin polymer consisting of polyethylene or polypropylene. In the case of lightly expanded polyolefin sheet, expansion ratio is typically less than about 2. FIG. 11 is a cross-sectional view showing the stiffening element 15, 105 made by a set of high-density polyethylene foam sheet 22, 122, polyethylene sheet 21, 121, and high-density polyethylene foam sheet 22, 122 bonded to the sides of the low-density polyethylene foam plates 16, 106.

FIG. 12 shows an alternative stiffening element of above embodiment FIG. 11 of the invention where the stiffening element 200 is made of a polypropylene sheet 201 sandwiched by a couple of high-density polypropylene foam sheets 202 and an adhesive resin 203 is used to bond the stiffening elements to the main body of foam core complex. Polypropylene sheet 201 has a thickness between 0.3 to 3 mm, and preferably a thickness of about 1.5 mm and has a density in the range of 0.91 to 0.98 g/cm$^3$, and preferably a density of about 0.92 g/cm$^3$. polypropylene foam sheets 202 has a thickness between 2 to 6 mm, and preferably a thickness of 4 mm and has a density in the range of 3 to 9 lb/ft$^3$, and preferably a density of about 6 lb/ft$^3$.

Figure 1:
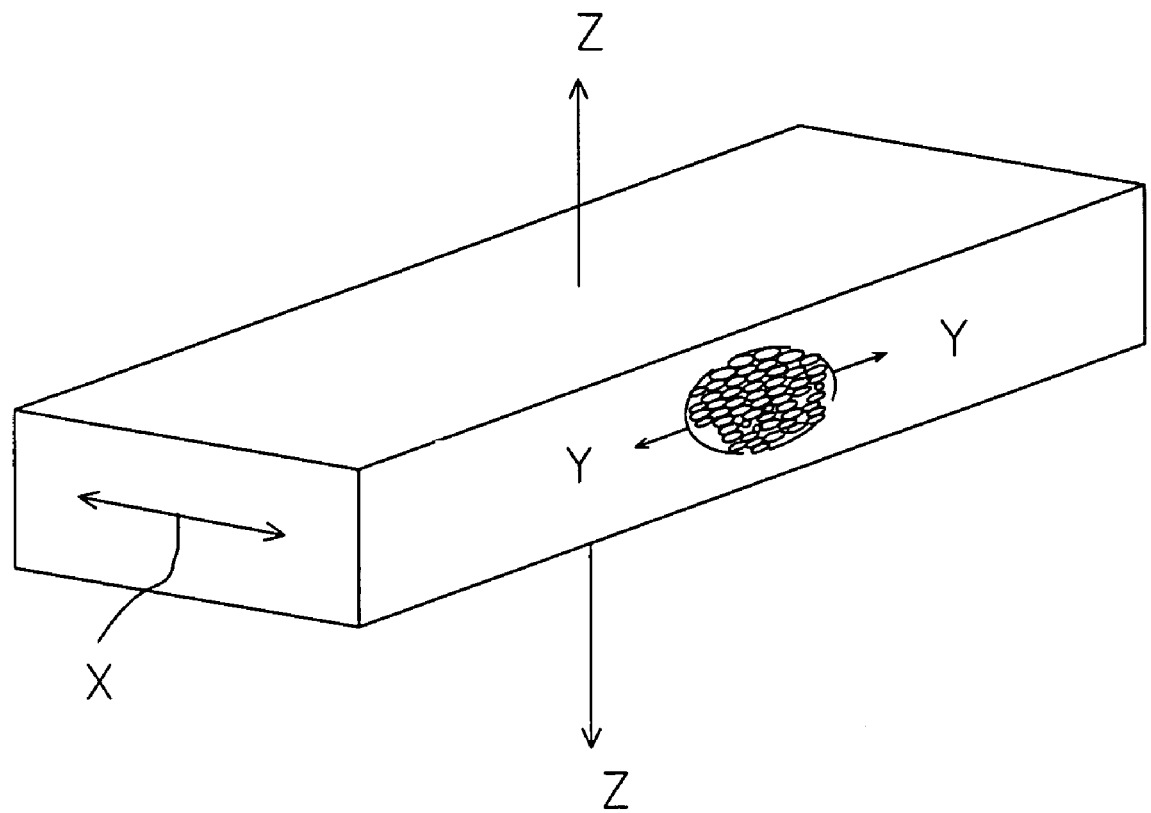
FIG. 1 is a perspective view of a foam sheet material of the sports board according to the present invention.
Figure 2:
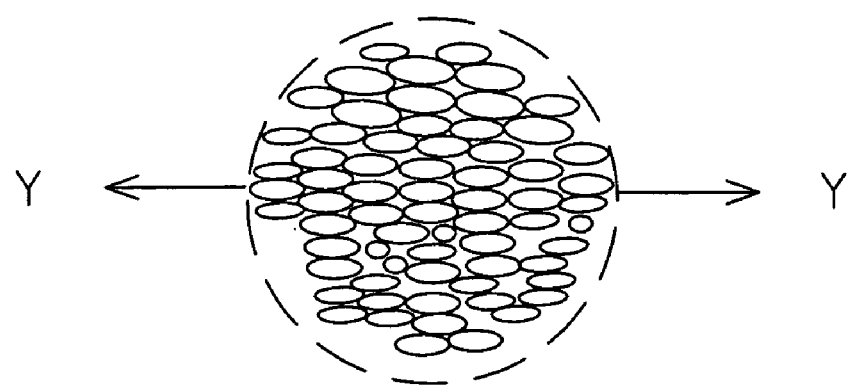
FIG. 2 is a magnified view of the encircled section of FIG. 1 showing the anisotropic material property.

FIG. 13 shows another alternative stiffening element of the above embodiments FIGS. 11 and 12. The stiffening element 210 is high-density polyolefin foam sheet. In the preferred embodiment, Layer 210 is polyethylene foam, which is cut from an extruded polyethylene foam sheet in such an orientation that the foam sheet extrusion direction of the strip cut represented by the Y-axis of the extruded polyolefin foam sheet as shown in FIG. 1 is generally perpendicular to the surface of the sports board. The high compressive strength of polyethylene foam sheet parallel to the direction Y of foam extrusion provides mechanical stiffening to the sports board. Layer 210 has a thickness between 3 to 8 mm, and preferably a thickness of about 5 mm and has a density in the range of 4 to 10 lb/ft$^3$, and preferably a density of about 8 lb/ft$^3$. Thus, the strip of foam has a foam extrusion direction that helps support the rider because the rider weight presses against the direction of the foam extrusion.

Figure 14:
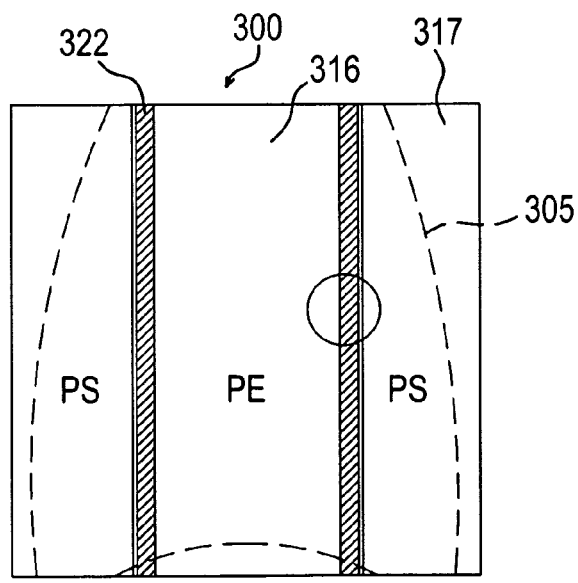
FIG. 14 shows a fourth embodiment of the present invention wherein the foam core complex comprising a composite low density main body sections of center polyethylene foam and side EPS foam and a couple of stiffening elements of high-density polyethylene foam sheet.
Figure 15:
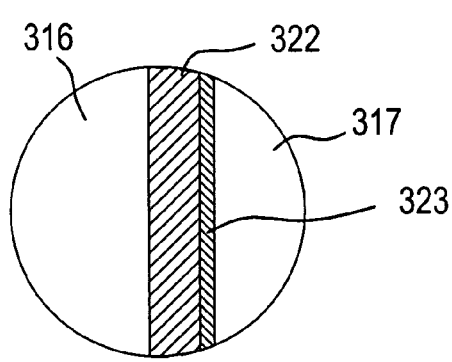
FIG. 15 is a magnified view of the encircled section of FIG. 14 showing the stiffening elements are bonded to the center polyethylene foam plate directly and to the side EPS foam plates through an adhesive resin.
Figure 20:
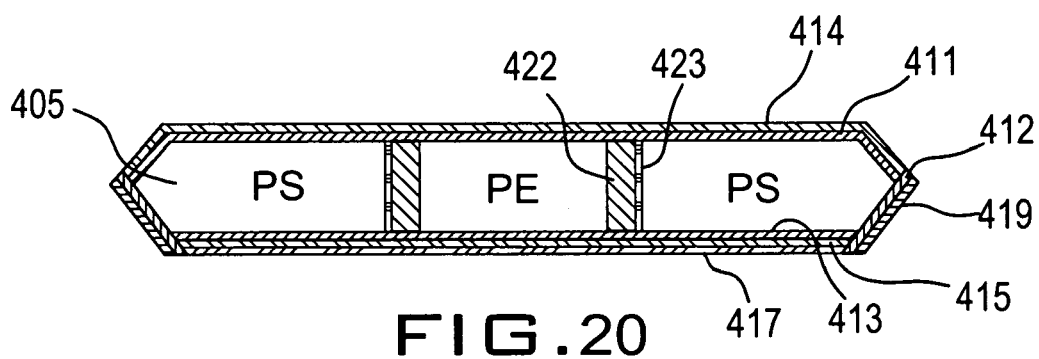
FIG. 20 is a cross-sectional view of the complete bodyboard utilizing the composite foam core according to the fourth and fifth embodiments shown in FIGS. 14 and 18, respectively.

A fourth embodiment of the present invention is shown in FIG. 14, 15 where the foam core complex 305 comprises a central polyethylene foam plate 316 and two opposite side expanded polystyrene (EPS) foam plates 317 and a couple of binding laminates 322/323 of high-density polyethylene foam sheet and adhesive resin layer in between the foam plates 316 and 317. The adhesive resin layer 323 is employed to improve the bond between the high-density polyethylene foam sheet and the low density EPS foam plate. Alternatively a copolymer foam layer of polyethylene and polystyrene may replace the adhesive resin layer 323. Here, the polypropylene (PP) foam material may replace the polyethylene foam for the central foam plate 316 that is the low-density foam base core. FIG. 14 shows the stiffening elements of low-density polystyrene foam on the left and right sides of the central low-density polyethylene foam base core, which is a preferred configuration for bodyboard. The outline of a bodyboard 300 can be cut out and shaped to the desirable front, tail and rails configuration. Then the shaped composite foam core is ready for laminating steps with the slick bottom and the top deck as shown in FIGS. 16 and 17. A reverse construction as shown in FIG. 20 having polyethylene foam on the left and right sides of a central low density polystyrene foam stiffening plate is more desirable configuration for the application of snow sled. The less rigid polyethylene foam provides greater side flexibility to the snow sled for improved steering and maneuvering.

FIG. 16 shows the manufacturing method to make binding laminate 322/323 for bonding the central polyethylene foam plate 316 with the polystyrene foam side plate 317. This adhesive resin 323 is extruded from a conventional extruder 331 and dispensed to one surface of polyethylene foam sheet 322, forming a binding laminate 322/323 that is taken up by a pair of nipping rolls 136.

The heat laminating process to heat bond the low density polyethylene foam plate 316 to EPS plate 317 is similar to the process of making the foam core complex 15 of the first embodiment as illustrated in FIG. 8. After the foam core complex 305 is completely assembled, it is then die cut, trimmed and shaped to the desirable shape and edge configuration. The fabrication of the bottom skin laminate and top skin laminate is the same as the process of the third embodiment. However an additional layer of adhesive resin needs to be applied to the inner surface of both bottom skin laminate and top skin laminate as shown in FIG. 16. The bottom skin laminate and top skin laminate are then heat laminated by the same heat laminating process of the third embodiment as shown in FIG. 17.

Figure 18:
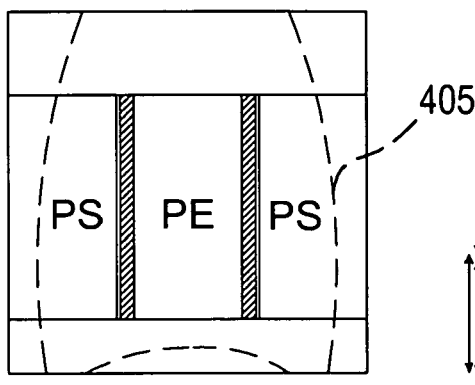
FIG. 18 is a top view diagram of a possible configuration and embodiment.
Figure 19:
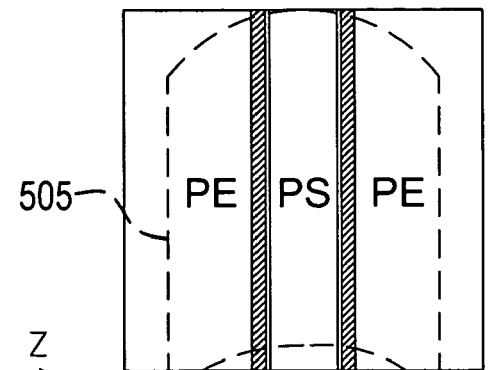
FIG. 19 is a top view diagram of a possible configuration and embodiment.

FIGS. 18 and 19 show two different embodiments with polystyrene (PS) foam as the stiffening elements.

FIG. 18 shows a foam core complex 405 according to the fifth embodiment of the present invention. Instead of having the stiffening elements extending from the nose to tail, the nose section and the tail section are made out of the same blank material as the low density polyethylene base core. The low density polystyrene foam on the left and right sides work as stiffening elements and strengthen the middle region for supporting a rider in surfing but allowing flexibility in the nose and tail regions. It is particularly useful that the flexibility near the front quarter length of nose improves steering in a bodyboard, while the polystyrene foam on the left and right side provides adequate bending resistance along the Y-Z plane contributing to improved maneuverability of the bodyboard.

FIG. 20 shows a cross-sectional view of the sports boards 300, 400 of the fourth and fifth embodiments shown in FIGS. 14 and 18, respectively. The composite foam core 305, 405 is covered by a number of layers on the top surface, bottom surface and side surfaces.

As illustrated In FIG. 20, sports board 300 and 400 has a top skin laminate, bottom skin laminate and rail skin laminates. The top skin laminate is a laminate of Layer 414 and 411. The bottom skin laminate is a laminate of Layer 413, 415, and 417. The rail skin laminates are laminates of Layer 412 and 419. Layer 414, 415, 417 and 419 are of the same structure and composition as Layers 124, 125, 127 and 109 respectively, of the third embodiment. Layer 323, 411, 413 and 412 are anhydride-modified ethylene vinyl acetate. These layers have thickness in the range of 0.02 to 0.15 mm and preferably of about 0.07 mm and a density in the range of 0.90 to 0.98 g/cm$^3$ and preferably of about 0.95 g/cm$^3$. Layer 322 is polyethylene foam. Layer 322 has a thickness between 2 to 6 mm, preferably a thickness of about 4 mm and has a density in the range of 4 to 10 lb/ft$^3$, and preferably of about 8 lb/ft$^3$. Polyethylene foam plate 316 has a density in the range of 1.6 to 3 lb/ft$^3$, and preferably a density of about 2.2 lb/ft$^3$. Polystyrene foam plate 317 has a density in the range of 1 to 2.5 lb/ft$^3$, and preferably a density of about 1.5 lb/ft$^3$.

The reverse construction is shown in FIG. 19, which is the sixth embodiment of the present invention, preferable for snow slide application. As illustrated in the diagram, a central polystyrene foam plate is coupled to a low-density polyethylene foam base core as stiffening element that makes the sled more rigid allowing a higher sliding speed. The polyethylene foam on the two sides is more flexible allowing greater directional control. When a force is applied to lift one side, the frictional force is reduced on the right side allowing the board to turn left.

Figure 21:
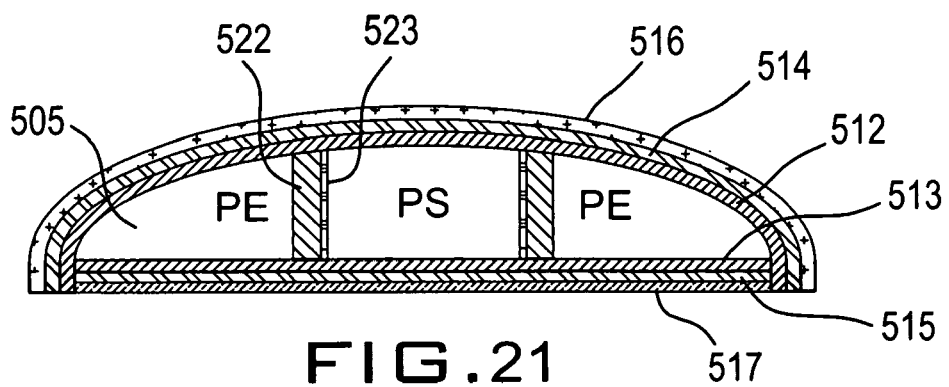
FIG. 21 is a cross-sectional view of the complete foam sled including the composite foam core of the sixth embodiment shown in FIG. 19.

FIG. 21 shows a cross-sectional view of the sports board 500 of the sixth embodiment shown in FIG. 19. The top skin laminate of sports board 500 comprises a top skin laminate of layers 512, 514 and 516. The bottom skin laminate comprises Layer 513, 515, and 517. Layer 514, 515, 516 and 517 are of the same structure and composition as Layers 24, 25, 56 and 27 respectively, of the first embodiment. Layer 512, 523 and 513 are anhydride-modified ethylene vinyl acetate. These layers have thickness in the range of 0.02 to 0.15 mm and preferably of about 0.07 mm and a density in the range of 0.90 to 0.98 g/cm$^3$ and preferably of about 0.95 g/cm$^3$. Layer 522 is polyethylene foam that has the same composition and construction as layer 322 in the fifth embodiment. Polyethylene foam plate and Polystyrene foam plate have the same composition and construction as those in the fifth embodiment.

The same manufacturing process as the sports board 300 of the fifth embodiment as described above can fabricate sports board 400. Similarly, sports board 500 can be fabricated by the same manufacturing process as the sports board 10 of the first embodiment.

Figure 22:
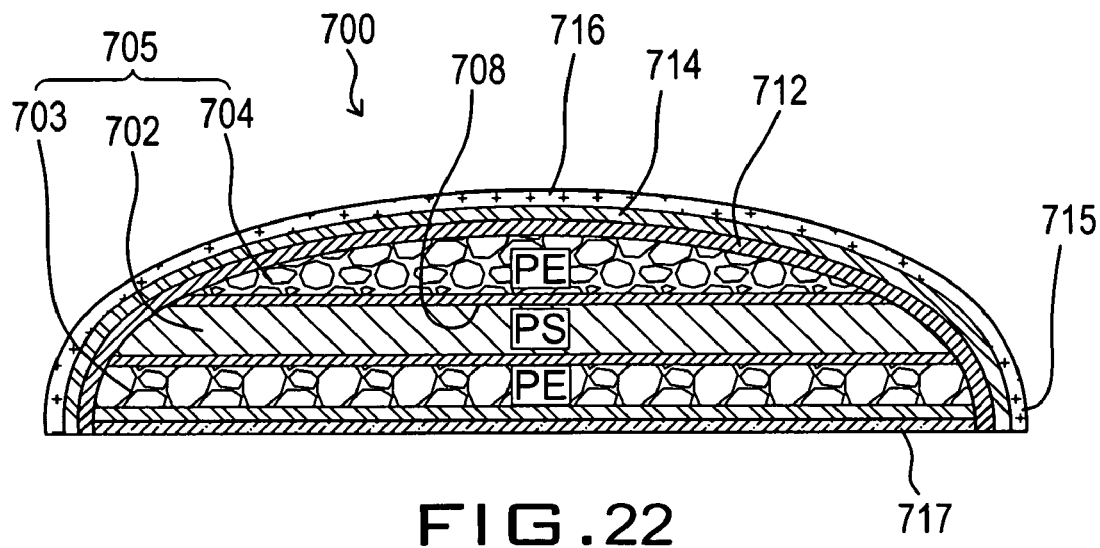
FIG. 22 shows a seventh embodiment of the present invention wherein a foam sled has a foam core complex consisting of five layers including a horizontal low density expanded polystyrene foam and a top and a bottom layers of low density polyethylene foam layers.

FIG. 22 illustrates the seventh embodiment of the present invention. The foam board is constructed as a foam sled 700 to ride on at snow-covered slopes, wherein the composite foam core 705 consists of five layers laminated together in which bonding surfaces are oriented in a direction generally parallel to the X-Z plane of the board. A central low density EPS foam 702, working as the stiffening element for the board, is laminated with a low density polyethylene foam base core 703, 704 on both top and bottom surfaces through the respective binding layers 706 and 708. The binding layers may be adhesive resin or copolymer foam of polystyrene and polyethylene.

The top skin laminate of sports board 700 comprises a top skin laminate of layers 712, 714 and 716. The bottom skin laminate comprises Layer 715, and 717. Layer 714, 715, 716 and 717 are of the same structure and composition as Layers 24, 25, 56 and 27 respectively, of the first embodiment. Layer 706, 708 and 712 are anhydride-modified ethylene vinyl acetate. These layers have thickness in the range of 0.02 to 0.15 mm and preferably of about 0.07 mm and a density in the range of 0.90 to 0.98 g/cm$^3$ and preferably of about 0.95 g/cm$^3$. Polyethylene foam plate 703 and 704 have thickness in the range of 5 to 25 mm, and preferably of about 8 mm and have density in the range of 1.6 to 3 lb/ft$^3$, and preferably a density of about 2.2 lb/ft$^3$. Polystyrene foam plate 702 has a thickness in the range of 8 to 30 mm, and preferably of about 12 mm and a density in the range of 1 to 2.5 lb/ft$^3$, and preferably a density of about 1.5 lb/ft$^3$.

The laminated foam core is formed in a series of steps. As shown in FIG. 16, Extruder 331 extrudes a continuous film of Layer 708 and disposes onto the surface of Layer 704 to form a laminate 704/708. The resulting laminate 704/708 is then heat laminated to polystyrene foam layer 702 using a conventional heat laminating process to form laminate 704/708/702. Similarly a laminate of layers 706/703 is heat laminated to the laminate 704/708/702, forming the completely laminated foam core 705. The resulting foam core assembly is then trimmed and shaped to the desirable shape and edge configuration. The top skin laminate and the bottom skin laminate can then be heat laminated to the resulting foam core to form a complete sports board 700 by the same heat laminating process as the sports board 10 of the first embodiment shown in FIG. 17. The upper and lower PE foam plates 703 and 704 on both sides of the EPS central foam plate 702 provide cushioning and shock absorbing advantage to a foam sled rider while the EPS plate 702 reinforces the stiffness of the foam sled 700, allowing higher sliding speed and improved traction stability.

Figure 23:
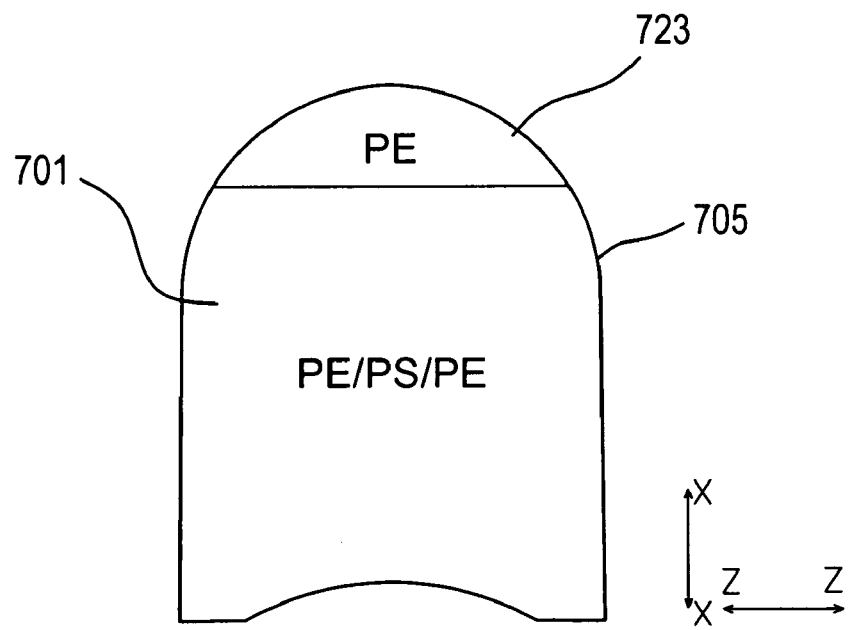
FIG. 23 is a top view diagram of a foam core complex according to the seventh embodiment of FIG. 22.

Referring to FIG. 23, similar to the first embodiment, a front section 723 also called a nose 723 may be made out of the same blank material as the low density polyethylene foam base and is bonded to the front end of the foam core complex 705 to allow greater nose flexibility for improved shock absorbing property.

While the presently preferred form of the sports board has been shown and described, and several modifications thereof discussed, persons skilled in this art will readily appreciate that various additional changes and modifications may be made without departing from the spirit of the invention, as defined and differentiated by the following claims.

The invention claimed is:

1. A sports board for use on a gliding surface such as snow slope comprising:
   a. a laminated composite foam core comprising a low-density polyolefin foam base, having a substantially planar elongated main body, a top surface, a bottom surface, a substantially symmetrical elongate side edge surfaces; the board having one or both end portions having an upturned shape acting as the leading end of the gliding board;
   b. an elongated stiffening element layer having a first bonding surface and an opposing second bonding surface, wherein the surfaces are heat laminated to the polyolefin foam base and oriented in a direction generally parallel to the X-Y plane of the core, wherein the stiffening element comprises substantially polyolefin foam with flexural strength substantially higher than the low-density polyolefin foam base, and wherein the stiffening element provides mechanical stiffening to the sports board;
   c. a plastic bottom layer laminated to the bottom surface of the composite foam core;

d. a top layer covering the top surface of the composite foam core.

2. The sports board set forth in claim 1, wherein the stiffening element layer is a high-density polyolefin foam strip cut from an extruded polyolefin foam sheet, wherein the high-density polyolefin foam strip, wherein the foam strip has a foam strip extrusion direction generally perpendicular to the surface of the sports board; wherein the foam strip has a thickness selected from a range of thickness between 3 to 8 mm.

3. The sports board set forth in claim 1, wherein the stiffening element layer comprises a central layer of polyolefin plate sandwiched between two layers of high-density polyolefin foam sheets, the polyolefin plate being heat laminated to the polyolefin foam sheets, wherein the polyolefin foam sheets have a higher density than the low-density polyolefin foam base, wherein the polyolefin plate has a thickness in the range of 0.3 to 3 mm and the polyolefin foam sheets have a thickness in the range of 2 to 6 mm.

4. The sports board set forth in claim 1 further including an adhesive resin binding layer between the high-density polyolefin foam sheets and the low density polyolefin foam base.

5. The sports board of claim 1, further including an integral end section of thermoplastic polyolefin foam bonded to the composite foam core with the bonding surface generally perpendicular to the surface of the sports board, whereby an enhanced flexibility is obtained in the selected end section for desirable properties of shock absorbing and up-turn rocker.

6. The sports board of claim 1, wherein the polyolefin foam core base is selected from a group consisting of homopolymer and copolymer of polyethylene, homopolymer and copolymer of polypropylene, a copolymer of polyethylene and ethylene vinyl acetate, and a copolymer of polyethylene and polystyrene.

7. A sports board for use on a gliding surface such as ocean surf comprising:
   a. a laminated composite foam core comprising a low-density polyolefin foam base, having a generally planar configuration with a top surface, a bottom surface, two side surfaces and front and back surface;
   b. an elongated stiffening element layer having a first bonding surface and an opposing second bonding surface, wherein the surfaces being heat laminated to the polyolefin foam base and oriented in a direction generally parallel to the X-Y plane of the core, wherein the stiffening element comprising substantially polyolefin foam with flexural strength substantially higher than the low-density polyolefin foam base and the stiffening element provides mechanical stiffening to the sports board;
   c. angularly outwardly extending side rails extending generally along the length of the board, comprising an upper and lower side rail surface;
   d. a low-frictional thermoplastic polymer film laminated to the bottom surface of the board, the polymer film providing a bottom surface a low-frictional, smooth polymer film surface suitable for gliding purposes; and
   e. a thermoplastic polymer skin laminated to the upper side rail surfaces, front and back surfaces and upper surface of the board.

8. The sports board set forth in claim 7, wherein the stiffening element layer is a high-density polyolefin foam strip cut from an extruded polyolefin foam sheet, wherein the foam strip is cut to have a foam strip extrusion direction generally perpendicular to the surface of the sports board; wherein the foam strip has a thickness selected from a range of thickness between 3 to 8 mm.

9. The sports board set forth in claim 7, wherein the stiffening element layer comprises a central layer of polyolefin plate sandwiched between two layers of high-density polyolefin foam sheets, the polyolefin plate being heat laminated to the polyolefin foam sheets, wherein the polyolefin foam sheets have a higher density than the low-density polyolefin foam base, wherein the polyolefin plate has a thickness in the range of 0.3 to 3 mm and the polyolefin foam sheets have a thickness in the range of 2 to 6 mm.

10. The sports board set forth in claim 7, further including an adhesive resin binding layer between the high-density polyolefin foam sheets and the low density polyolefin foam base.

11. The sports board of claim 7, further including an integral end section of thermoplastic polyolefin foam bonded to the composite foam core with the bonding surface generally perpendicular to the surface of the sports board, whereby an enhanced flexibility is obtained in the selected end section for improved maneuvering of the board in directional steering.

12. The sports board of claim 7, wherein the polyolefin foam core base is selected from a group consisting of homopolymer and copolymer of polyethylene, homopolymer and copolymer of polypropylene, a copolymer of polyethylene and ethylene vinyl acetate, and a copolymer of polyethylene and polystyrene.

13. A sports board for use on a gliding surface such as ocean surf comprising:
   a. a laminated composite foam core having a generally planar configuration with a top surface, a bottom surface, two side surfaces and front and back surface, comprising a low-density polyethylene foam central section sandwiched between two polystyrene foam side sections, the polyethylene foam having a first bonding surface and an opposing second bonding surface, wherein the surfaces being heat laminated to the polystyrene foam by a binding layer and oriented in a direction generally parallel to the X-Y plane of the board, wherein the polystyrene foam with flexural strength substantially higher than the polyethylene foam and the polystyrene foam provides mechanical stiffening to the sports board;
   b. angularly outwardly extending side rails extending generally along the length of the board, comprising an upper and lower side rail surface;
   c. a low-frictional thermoplastic polymer film laminated to the bottom surface of the board, the polymer film providing a bottom surface a low-frictional, smooth polymer film surface suitable for gliding purposes; and
   d. a thermoplastic polymer skin laminated to the upper side rail surfaces, front and back surfaces and upper surface of the board.

14. The sports board of claim 13, wherein the polyethylene foam comprises homopolymer and copolymer of polyethylene and the polystyrene foam comprises homopolymer and copolymer of polystyrene.

15. The sports board of claim 13, wherein the binding layer comprises an adhesive resin or a copolymer foam of polystyrene and polyethylene.

16. The sports board of claim 13, further including an integral end section of thermoplastic polyolefin foam bonded to the composite foam core with the bonding surface generally perpendicular to the surface of the sports board, whereby an enhanced flexibility is obtained in the selected end section for improved maneuvering of the board in directional steering.

17. A sports board for use on a gliding surface such as snow slope comprising:
   a. a laminated composite foam core having a generally planar configuration with a top surface, a bottom surface, a substantially symmetrical elongate concave side edges surfaces, comprising a central polystyrene foam section sandwiched between two low density polyethylene foam side sections, the polystyrene foam having a first bonding surface and an opposing second bonding surface, wherein the surfaces being heat laminated to the low-density polyethylene foam by a binding layer and oriented in a direction generally parallel to the X-Y plane of the core, wherein the polystyrene foam with flexural strength substantially higher than the polyethylene foam and the polystyrene foam provides mechanical stiffening to the sports board;
   b. a plastic bottom layer laminated to the bottom surface of the composite foam core;
   c. a top layer covering the top surface of the composite foam core.

18. The sports board of claim 17, wherein the polyethylene foam comprises homopolymer and copolymer of polyethylene and the polystyrene foam comprises homopolymer and copolymer of polystyrene.

19. The sports board of claim 17, wherein the binding layer comprises an adhesive resin or a copolymer foam of polystyrene and polyethylene.

20. The sports board of claim 17, further including an integral end section of thermoplastic polyolefin foam bonded to the composite foam core with the bonding surface generally perpendicular to the surface of the sports board, whereby an enhanced flexibility is obtained in the selected end section for desirable properties of shock absorbing and up-turn rocker.

21. A sports board for use on a gliding surface such as snow slope comprising:
   a. a laminated composite foam core having a generally planar configuration with a top surface, a bottom surface, a substantially symmetrical elongate concave side edges surfaces, comprising a central polystyrene foam section sandwiched between two low-density polyethylene foam side sections, the polystyrene foam having a first bonding surface and an opposing second bonding surface, wherein the surfaces being heat laminated to the low-density polyethylene foam by a binding layer and oriented in a direction generally parallel to the X-Z plane of the board, wherein the polystyrene foam with flexural strength substantially higher than the polyethylene foam and the polystyrene foam provides mechanical stiffening to the sports board;
   b. a plastic bottom layer laminated to the bottom surface of the composite foam core;
   c. a top layer covering the top surface of the composite foam core.

22. The sports board of claim 21, wherein the polyethylene foam comprises homopolymer and copolymer of polyethylene and the polystyrene foam comprises homopolymer and copolymer of polystyrene.

23. The sports board of claim 21, wherein the binding layer comprises an adhesive resin or a copolymer foam of polystyrene and polyethylene.

24. The sports board of claim 21, further including an integral end section of thermoplastic polyolefin foam bonded to the composite foam core with the bonding surface generally perpendicular to the surface of the sports board, whereby an enhanced flexibility is obtained in the selected end section for desirable properties of shock absorbing and up-turn rocker.

25. A sports board for use on a gliding surface such as snow slope comprising:
   a) a multi-layered laminated composite foam core having a substantially planar elongated main body, a bottom surface, a top surface, a substantially symmetrical elongated concave side edges; and the board arranged and constructed in length, width and thickness to support a user for gliding purposes, the board characterized by having one or both end portions having an upturned shape acting as the leading end of the gliding board wherein the board comprising alternative layers of a low-density polyolefin foam core base and polyolefin foam stiffening element layer, the polyolefin foam stiffening element layer comprised substantially of a polyolefin foam and heat laminated to the polyolefin foam base with bonding surfaces oriented in a direction generally parallel to the X-Y plane of core; the stiffening element has substantial higher flexural strength than the foam core base;
   b) a plastic bottom layer laminated to the bottom surface of the composite foam core;
   c) a top layer covering the top surface of the composite foam core.

26. A sports board for use on a gliding surface such as snow slope comprising:
   a. a laminated composite foam core having a generally planar configuration with a top surface, a bottom surface, a substantially symmetrical elongate concave side edges surfaces, comprising alternative, generally planar layers of a polyethylene foam layer, and a polystyrene foam layer; the polyethylene foam layer and polystyrene layer oriented in a direction generally parallel to the X-Z plane of the core, the polystyrene foam layer has substantially higher flexural strength than the polyethylene foam layer and the polystyrene foam provides mechanical stiffening to the sports board;
   b. a plastic bottom layer laminated to the bottom surface of the composite foam core;
   c. a top layer covering the top surface of the composite foam core.

27. The sports board set forth in claim 26, wherein the stiffening element comprises a member selected from the group consisting of
   (a) a high-density polyolefin foam strip cut from an extruded polyolefin foam sheet, wherein the foam strip is cut to have a foam extrusion direction generally perpendicular to the surface of the sports board; wherein the foam strip has a thickness selected from a range of thickness between 3 to 8 mm, and the polyolefin foam comprising of homopolymer or copolymer of polyethylene or polypropylene, and
   (b) a sandwiched structure of polyolefin foam/polyolefin plate/polyolefin foam, wherein the polyolefin material comprising homopolymer or copolymer of polyethylene or polypropylene, and
   (c) polystyrene foam.

* * * * *